Nov. 25, 1958 — A. U. BRYANT — 2,861,771
GATE VALVE
Filed Feb. 23, 1954 — 3 Sheets-Sheet 1
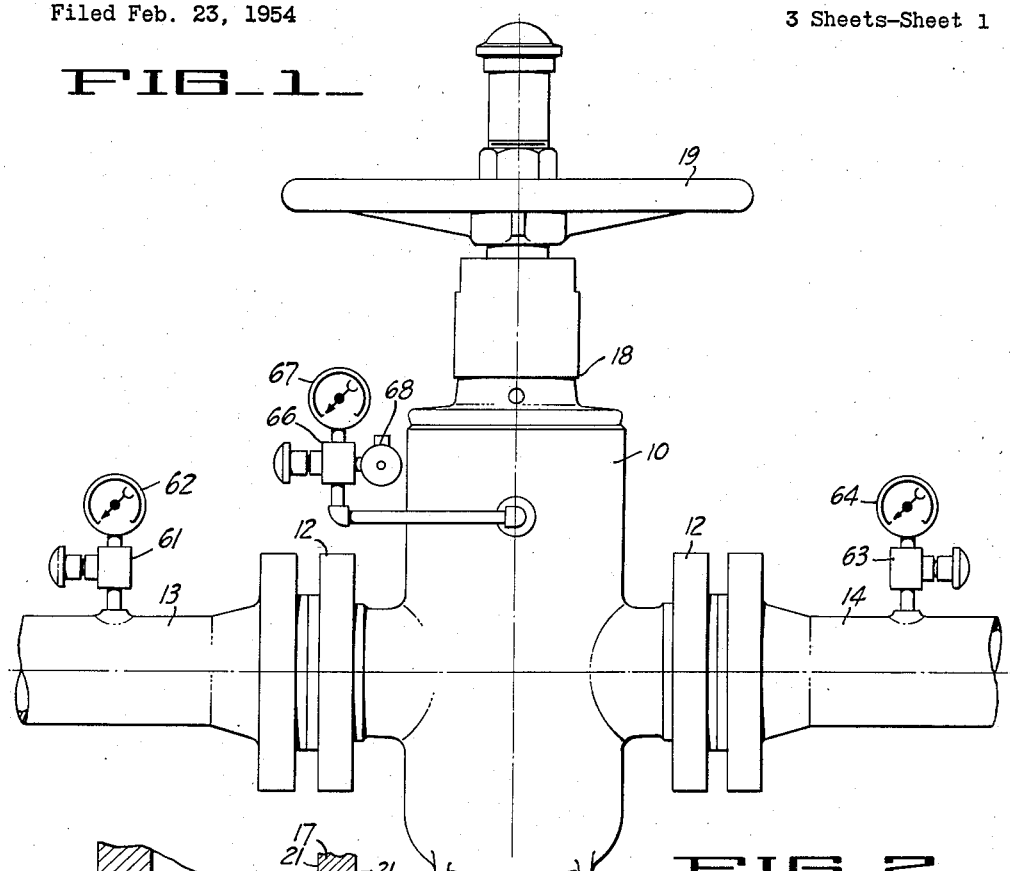
FIG_1_
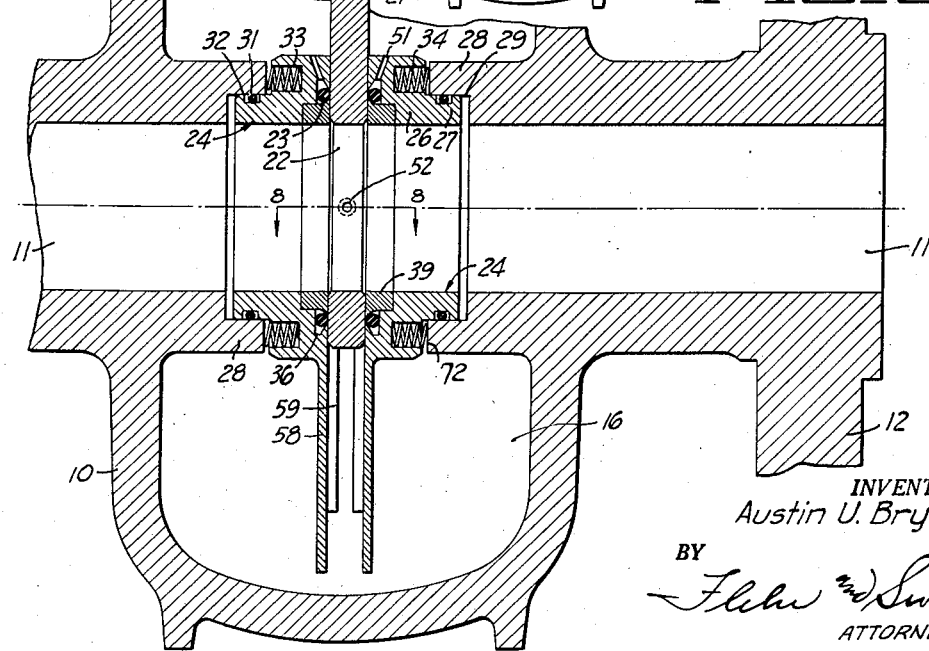
FIG_2_
INVENTOR.
Austin U. Bryant
ATTORNEYS

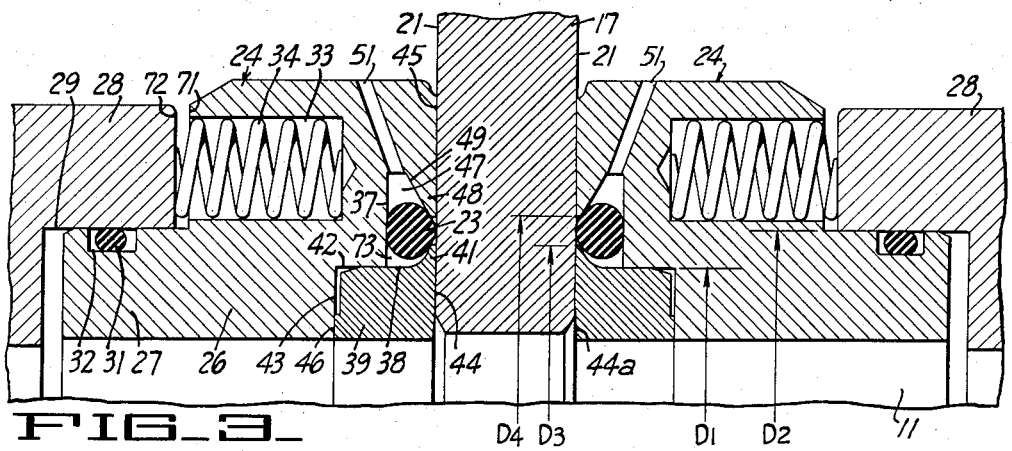
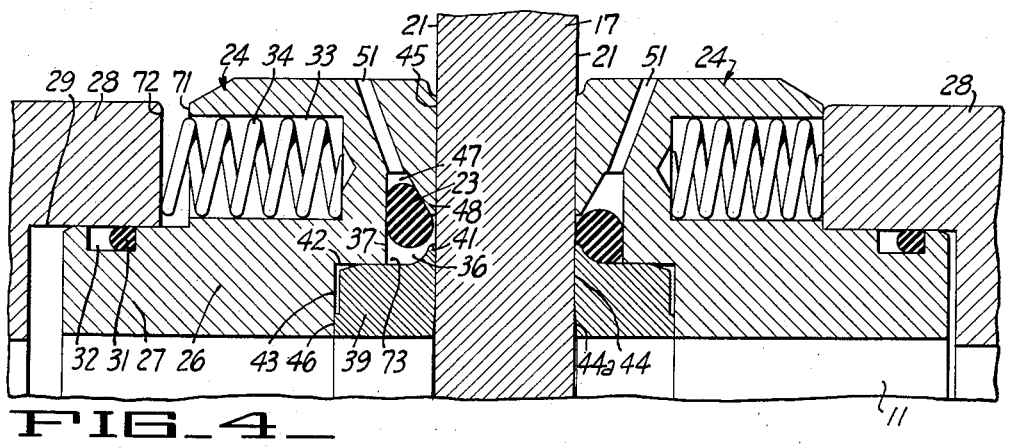
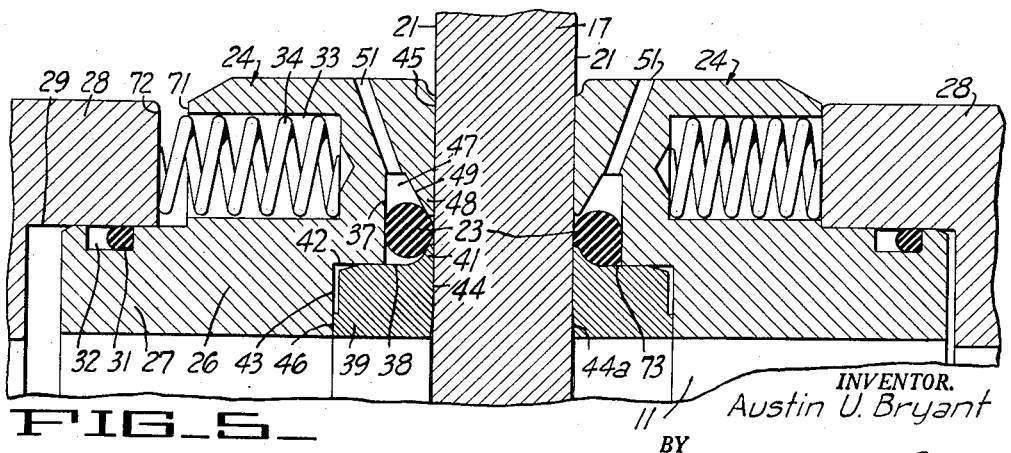

Nov. 25, 1958    A. U. BRYANT    2,861,771
GATE VALVE
Filed Feb. 23, 1954    3 Sheets-Sheet 3
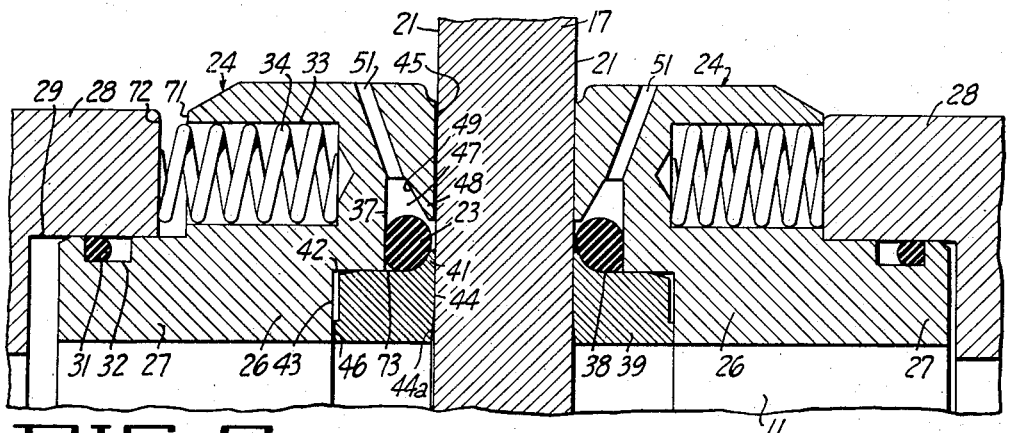
FIG_6_
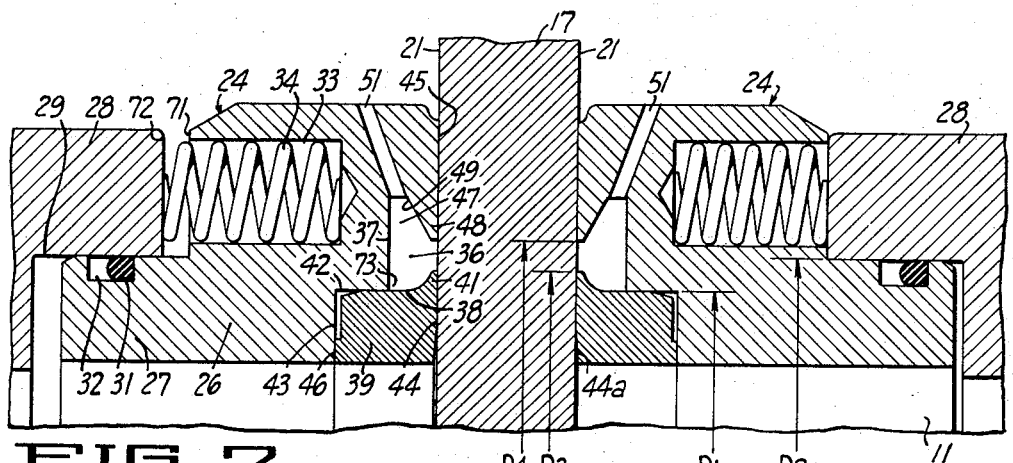
FIG_7_
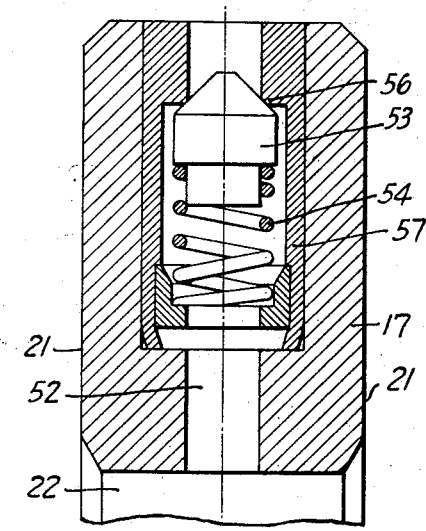
FIG_8_
INVENTOR
Austin U. Bryant
BY
Flehr & Swain
ATTORNEYS

United States Patent Office 2,861,771
Patented Nov. 25, 1958

2,861,771

GATE VALVE

Austin U. Bryant, Walnut Creek, Calif., assignor, by mesne assignments, to Walworth Company, New York, N. Y., a corporation of Massachusetts Application February 23, 1954, Serial No. 411,967

6 Claims. (Cl. 251—172)

This invention relates generally to valves of the type used for controlling flow of various fluids, including gases and liquids, and particularly to valves making use of one or more resilient seal rings.

In my co-pending application Serial No. 331,839, filed January 19, 1953, now abandoned, of which this application is a continuation in part, there is disclosed a valve making use of a seal ring of the O ring type, and which provides a bubble tight shutoff for closed valve position. One particular gate valve construction disclosed therein employs two seal rings formed of resilient material such as synthetic rubber, together with a mounting means for the same, one on each side of the valve member. The arrangement is such that for closed position of the valve the seal is established upon the downstream side of the valve member. A seal upon the upstream side of the gate is avoided by constructing the mounting means in such a fashion that when the upstream O ring is urged outwardly by a pressure differential applied to the innerside of the same, it is disengaged from sealing contact with the valve member.

It is an object of the present invention to improve in certain respects upon the gate valve disclosed in the above mentioned co-pending application, particularly with respect to the construction of the mounting means for the O rings.

Another object of the invention is to provide a gate valve of the above character having improved means for relieving body pressure.

Another object of the invention is to provide a gate valve of the above character having means forming a secondary seal between supplemental valve working surfaces, and which is effective in the event the resilient O rings become inoperative due to destruction or excessive wear.

Another object of the invention is to provide a valve of the above character which can be subjected to simple tests to make certain that no leakage is occurring.

Additional objects and features of the invention will occur from the following description in which the preferred embodiments have been set forth in detail in conjunction with the accompanying drawings.

Referring to the drawings:

Figure 1 is a side elevational view illustrating a gate valve incorporating the present invention.

Figure 2 is a detail view in section, and on an enlarged scale, illustrating the principal working parts of the valve shown in Figure 1.

Figures 3 to 7 inclusive are enlarged details in section serving to illustrate the manner in which the mounting means and the resilient O rings cooperate and make possible certain results for different operating conditions.

Figure 8 is an enlarged detail in section illustrating a small check valve suitable for application to the duct which serves to connect the body space with the port through the valve gate.

The valve illustrated in Figures 1 and 2 of the drawings consists of a body 10 provided with flow passages 11. Flanges 12 or other suitable means can be provided for coupling the body to the associated piping 13 and 14. Within the body there is a closed space 16 which serves to accommodate the valve gate 17. One end of the gate is attached to an operating rod or stem, which extends through the removable bonnet 18. This bonnet assembly can be in accordance with that disclosed and claimed in my co-pending application Serial No. 349,849, filed April 20, 1953. Suitable valve operating means is associated with the exterior end of the stem, and may include the hand wheel 19. A suitable operating means is likewise disclosed in said application 349,849.

The gate 17 is of the flat plate type, having planar parallel side surfaces (i. e. valve working surfaces) 21. The port 22 formed in this plate is adapted to register with the passages 11 for open position of the valve.

The side surfaces 21 of the gate are adapted to be engaged by the resilient seal rings 23 of the O ring type, and these rings in turn are retained by the annular mounting assemblies 24. The arrangement is such that normally the seal rings together with the mounting assemblies establish a fluid tight seal between the body and the gate.

As illustrated particularly in Figure 2, each of the mounting assemblies 24 consists of a metal ring 26, which has a portion 27 of reduced exterior diameter. The adjacent portion 28 of the valve body is provided with a cylindrical bore 29 in which the portion 27 is slidably fitted. Leakage between these parts is prevented by suitable means such as the resilient ring 31 of the O ring type, which is accommodated in the annular groove 32.

Spring means is provided to urge the mounting rings toward the gate. Thus each ring is shown provided with a plurality of circumferentially spaced openings 33, which accommodate the compression springs 34. Normally these springs serve to urge the seal rings 23 into sealing contact with the gate surfaces 21, and as will be presently explained, with O rings having a fair degree of give (e. g. rings made of resilient synthetic rubber) the thrust of the springs serves normally to compress the O rings and also to cause direct contact between certain supplemental valve working surfaces.

Each of the resilient O rings 23 is accommodated in an annular recess 36 which is formed in the corresponding mounting means 24. Each recess is defined by a bottom surface 37 that extends substantially parallel to the corresponding gate surface 21, and a surface 38 which is formed on the inner seat ring 39. Surface 38 has a curved portion as illustrated, thereby forming the O ring retaining lip 41.

Each of the inner seat rings 39 preferably is made of suitable metal that is machined to slidably fit within the bore 42 in the mounting ring 26. Normally the annular surface 43 abuts the adjacent end surface of the seat ring 39, and the end face 44 of the seat ring 39 forms a supplemental valve working surface which contacts the adjacent surface 21 of the valve gate. The dimensioning of the parts preferably is such that the surface 44 of ring 39 extends a small distance (e. g. 0.005–0.002 in.) beyond the end surface 45 of the mounting ring 26. Therefore under normal conditions the thrust of the compression springs 34 is applied through the rigid ring 39, whereby this ring is compressed between the surfaces 43 and 21.

As illustrated in Figure 3 it generally is desirable to machine one end of each ring 39 to provide an annular land 46 of reduced radial width, whereby the pressure contact between ring 39 and the adjacent surface 43 is confined to the relatively narrow area of the land.

Each of the recesses 36 is provided with an extension 47, which in section is tapered as illustrated in Figure 3. The machining of the recess is such as to form the annular lip 48, the inner surface 49 of which (in section) extends at an acute angle to the plane of the surface 37. This angle can be of the order of 30°. Each of the recess portions 47 is in communication with the space 16 within the valve body through one or more ducts 51. As will be presently explained, under certain conditions an O ring may be expanded and squeezed into its associated recess portion 47, thereby breaking its sealing contact with the gate and preventing dislodgment of the upstream O ring during movement of the gate from closed to open positions.

As disclosed in my copending application Serial No. 365,801, in some instances it may be desirable to slightly relieve the surfaces 44 of the seat rings 39, adjacent the inner diameter of the same. Thus for example the surface region 44 can be relieved on an angle of say 20 seconds, for a radial distance which is less than one-half the radial width of the entire surface 44.

As shown particularly in Figure 2, it is desirable to provide the gate with a duct 52 which establishes communication between the port 22 and the valve body space 16. Preferably this duct is provided with a check valve to allow flow only from the body space to the port. The simple check valve illustrated in Figure 8 is suitable for this purpose, and consists of a valve member 53 formed of suitable material such as nylon, and which is urged by spring 54 toward the seat 56. The seat can be formed on the insert bushing 57. Such a check valve is opened by fluid pressure to permit flow of fluid from the body to the port 22, but prevents flow in the opposite direction. When the valve is in open position as shown in Figure 2, it is evident that pressure cannot be trapped in the body space 16 in excess of line pressure, because any such pressure differential immediately opens the check valve to permit body pressure to vent into the line.

Suitable guard plates 58 can be carried by the mounting means 24, in the manner shown in Figure 2. The edges of these plates are shown provided with ribs 59 for guiding the valve in its movements between open and closed positions.

For purposes to be presently described, some auxiliary equipment is shown in Figure 1. Thus a manually operated valve 61 permits the piping 13 to be connected with the pressure gauge 62. Valve 63 serves when open to connect the piping 14 with pressure gauge 64. Valve 66 when open serves to apply pressure from the body space 16 to the pressure gauge 67. Valve 68 when open serves to vent fluid from the body space 16 to the atmosphere.

In conjunction with the mounting means 24 for the resilient O rings it is desirable to utilize certain proportioning in order to obtain effects which will be presently described in detail. In Figures 3 to 7, inclusive, the diameters of certain parts have been indicated as D1, D2, D3 and D4. Diameter D1 is the diameter of the bore 42 in which the ring 39 fits. Diameter D2 is the diameter of the body bore 29. Diameter D3 is the outer diameter of the lip 41. Diameter D4 is the inner diameter of the lip 48. As is clearly evident in the drawing, diameter D2 is substantially greater than D1. Diameter D3 is intermediate to D1 and D2. The radial spacing between D3 and D4 is substantially less than (e. g. about ⅝th) the normal diameter of each resilient O ring in section.

Operation of my valve can best be explained by assuming a number of different operating conditions. Assuming first that no pressure is applied to either pipe 13 or 14, and that no pressure exists in the body space 16, the various parts are in the positions illustrated in Figure 3. The resilient O rings 23 press against the lips 41 and 48 and are compressed between the surfaces 21 and 37. By virtue of such compression sealing contact is established between each O ring and the adjacent gate surface 21, through the annular gap between the lips 41 and 48.

Assuming now that fluid pressure is applied to the pipe 13 (upstream side), and that the valve gate is in closed position, such pressure is applied to the inner periphery of the O ring 23 on the upstream side of the gate, and this pressure tends to expand the O ring radially. If sufficient fluid pressure is applied in this manner, as for example 300 p. s. i. or more, the O ring on the upstream side is expanded and squeezed into the recess extension 47, as illustrated in Figure 4. Thus sealing contact is broken between the expanded O ring and the adjacent surface 21 of the valve gate whereby pressure builds up in the body space 16. Body pressure is applied to the O ring 23 on the downstream side (the right-hand O ring 23 as viewed in Figure 4), whereby the downstream O ring is squeezed against the surface 38 of the inner seat ring 39. When the body pressure approaches the upstream line pressure, the differential fluid pressure acting upon the upstream O ring 23 is reduced sufficiently to permit this O ring to return to its relaxed position, as illustrated in Figure 5.

Previous reference has been made to the fact that the compression springs 34 urge both of the mounting rings 26 toward the gate 17, and that the spring thrust is transmitted through the inner rings 39. The valve is constructed with sufficient clearance between the ends of the main mounting rings 26 and the body, to facilitate some self aligning action, and to facilitate removal of parts to make repairs and replacements. Thus as shown in Figure 3 the end face 71 of each mounting ring 26 is spaced from the adjacent shoulder face 72, of the body. When line pressure is applied to one side of the valve, both of the O ring mounting assemblies together with the gate, are moved toward the downstream side, thereby bringing surfaces 71 and 72 into direct abutting contact, as illustrated in Figures 4 and 5. Thus in the condition assumed for Figure 5, the inner seat ring 39 of the downstream side of the valve carries the thrust of the compression springs 34, plus the thrust of fluid pressure from the upstream side acting upon gate. The seat ring 39 for the upstream side of the valve is urged against the gate by virtue of the corresponding compression springs 34.

Figure 5 represents the normal condition of the valve when fluid pressure is applied to one side of the same, and with the body pressure equal to that of the upstream line pressure. Assuming that application of pressure should be reversed, that is that the line pressure is applied to piping 14, the left-hand one of the two O rings as viewed in Figure 5 would be compressed against the seat ring 39, and the right-hand O ring 23 would be relaxed.

My valve construction incorporates means whereby if the line pressure is reduced while the valve is closed, fluid pressure in the body space 16 is vented to the line. Under such conditions the O ring 23 on the upstream side of the gate is retracted from sealing contact with the gate, thus permitting pressure in the body to vent to the line. This operation can best be understood by reference to Figure 6. In this instance it is assumed that fluid pressure has been applied to the left-hand passage 11, and that it has been suddenly reduced to a substantially lower value. As this reduction occurs a differential fluid pressure is applied to the upstream O ring 23, which tends to squeeze this O ring between the lip 41 and the surface 37. This in turn applies forces tending to urge the mounting ring 26 toward the left as viewed in Figure 6, against the compression of the corresponding springs 34. As a result sufficient movement takes place between this O ring and the adjacent surface 21 of the valve gate, to break sealing contact with the gate. This in turn permits body pressure to leak past the upstream O ring, and thence past the inner seat ring 39. Thus the body pressure is equalized with that of the line. If the line pressure on the upstream side of the valve should be lowered to a point where it is about equal or below that on the downstream side, the O rings on both the inflow and outflow sides of the valve may be retracted from the sealing contact with the gate, thus permitting body pressure to vent to both sides of the gate. However where the upstream pressure remains at a value substantially greater than that on the downstream side, the O ring on the downstream side retains its seal with the gate as illustrated in Figure 6, while venting occurs past the upstream O ring.

The venting action just described is made possible by the proper proportioning of the various diameters. When the upstream O ring is squeezed inwardly by an applied differential pressure, it applies force against the mounting ring 26 on an effective diameter which is substantially equal to diameter D1, and less than diameter D2. Therefore effective pressure areas exposed respectively to the body fluid pressure and to the line pressure upon the upstream side are such as to urge the mounting ring 26 to the left, when the body pressure exceeds the upstream line pressure.

Retraction of an O ring from sealing contact with the gate when a differential fluid pressure is applied to its exterior peripheral surface, should not be confused with the sealing action of the O ring on the downstream side for the normal operation illustrated for example in Figure 5. Under such circumstances the O ring 23 on the downstream side of the gate is likewise pressed against the inner seat ring 39. However the O ring under such circumstances is held against retraction, because the line pressure is urging the gate toward the right as viewed in Figure 5, with the surfaces 71 and 72 in direct contact.

Under all reasonable conditions the resilient O rings 23 can be relied upon to maintain an effective seal between the body and the gate. However if abnormal conditions, such as excessive wear or breakage, should make it impossible for these O rings to maintain a seal, a secondary seal is established by virtue of the inner seat rings 39. In order to illustrate this secondary sealing action in Figure 7, the O rings 23 have been omitted. Assuming that line pressure is being applied to the left-hand passage 11, the gate is forced against the inner seat ring 39 upon the down flow side, whereby the down flow seat ring provides a valve working surface for the gate. Here again on the down flow side the seat ring 39 takes the thrust of both line pressure and the force of the compression springs 34. Such pressure aids in maintaining a reasonably effective seal between the seat ring and the gate, and also between the seat ring and the surface 43. A seal between the seat ring and the surface 43 is aided by virtue of the reduced radial width of the land 46, which has the effect of increasing the bearing force per unit area. If desired the effectiveness of this secondary seal can be enhanced by coating the end faces of the seat rings 39 with various materials, such as a suitable elastomer like Teflon or nylon.

Various characteristics of my valve can be demonstrated by use of the pressure gauging equipment illustrated in Figure 1. Thus with the valve in open position, it will be assumed that a gradually increasing pressure is applied to the line, with the piping 14 closed at some point beyond the valve. This gradually increasing line pressure is indicated by the gauges 62 and 64. Initially gauge 67 will continue to show atmospheric pressure. At some pressure value, depending upon such factors as the size and hardness of the O rings, the gauge 67 will commence to show an increase in pressure. This pressure increase is caused by one or both of the O rings 23 being expanded to break sealing contact with the gate.

With the valve gate closed, and with the pipe 14 vented to the atmosphere, application of a gradually increasing pressure to the pipe 13, commencing with atmosphere, is again indicated by gauge 62. During the initial part of such pressure application gauge 67 will again continue to read atmospheric, until the pressure applied to the O ring 23 on the upstream side of the gate is sufficient (e. g. 300 p. s. i.) to cause this O ring to break its sealing contact with the gate, in the manner illustrated in Figure 4. Fluid immediately passes into the body space 16 to build up pressure in this space to a value which approaches that on the upstream side. Assuming that pipe 14 is sealed at some point below the gauge 64, this gauge continues to read atmospheric pressure, thus indicating that no leakage occurs.

Assuming now that an upstream pressure is being applied of the order of 1000 p. s. i., some fluid can be vented from the space 16, through valve 68, and the pressure in the body thereby dropped a considerable amount without flow of fluid from the line into the body. However when the body pressure has been dropped to produce a differential pressure between the line and the body which is sufficient to expand the O ring 23 on the upstream side of the gate, to interrupt its sealing contact with the gate, a flow of line fluid occurs into the body, which is evidenced by an increase in body pressure. If the body pressure is vented down to a value insufficient to cause the O ring 23 on the upstream side to break its sealing contact with the gate, then except for temperature changes which may occur, the body pressure remains constant. Such maintenance of constant fluid pressure in the body for a higher upstream pressure, can be used as a positive indication to show that no leakage is occurring past the valve.

As pointed out in said co-pending application 331,839 filed January 19, 1953, there is a tendency for the O rings 23 to be dislodged from their accommodating recesses, when the valve is being moved between closed and open positions. This applies particularly to valves being used on relatively high line pressures, as for example pressures of the order of 500 p. s. i. or more, to which valves of the present construction are particularly suitable. The lips 41 and 48 function to retain the O rings 23 against such dislodgement. Also squeezing of the O ring on the upstream side into the recess portion 47 tends to prevent its dislodgement during initial opening movement when fluid is flowing at high velocity past the O rings and through the small port opening, and the body pressure is less than the upstream line pressure. In addition the corners 73 of recesses 36 are in pressure equalizing communication with the line, thereby tending to aid retention of the O ring in the manner disclosed in said co-pending application. Pressure equalizing communication between the recess corners 73 and the line is established by virtue of leakage between the surfaces 43 and 46.

With respect to the secondary seal established by the inner seat rings 39, for the condition assumed in Figure 7, the mean effective diameter of the sealing engagement between each seat ring 39 and the gate is substantially less than the diameter D2. Also it is assumed that some leakage is occurring past the upstream ring 39, into the body, and from thence to the downstream side. The differential pressure thus established between the upstream line and the body acts upon the upstream mounting ring 26 to urge it toward the gate, or in other words to more tightly press the inner seat ring 39 against the gate, thus minimizing leakage.

The lips 41 together with the curved seating surfaces 38 for the O rings 23 greatly facilitate application of relatively high fluid pressures without causing injury or undue wear. Referring for example to Figure 3, it will be noted that the area of the O ring which is in sealing contact with the gate surface 21 is a minor faction of the total surface area of the O ring. In a typical instance the radial width between the lips 41 and 48, for the relaxed condition of Figure 3, can be of the order of 10 to 12% of the total circumference of the O ring, as considered in section. Thus with an O ring having a section diameter of 0.210 inch, the width of the contact area (without applied differential pressure) upon the surface 21 can be about 0.066 inch. As differential fluid pressure is increased upon the O ring, to cause it to be squeezed into the corners 73, the width of the contact area does not change to any material extent, whereby for the same O ring the width of the contact area can be of the order of 0.078 inch for differential fluid pressures of 500 p. s. i. or more. This is contrary to conventional O ring practice where rectangular shaped recesses are employed to accommodate the O rings. With a simple rectangular recess an increase in applied differential pressure results in an increase in the width of the contact area. This serves to increase wear at high operating pressures.

The further advantage resulting from the manner in which the O rings are supported and retained is that severe surface stressing effects of the O ring, such as tend to cause undue wear when the valve is moved between open and closed positions, are minimized. Thus with the present invention wear upon the O ring is reduced to a minimum, although the permissible operating pressure may be increased beyond conventional O ring practice. Thus in one particular instance, for a two inch valve the bore 42 had a diameter of 2 1/16 inches. The external and internal diameters of lips 41 and 48 were 2 39/64 and 2 7/8 inches respectively. This particular valve is suitable for line pressures of the order of from 1000 to 3000 p. s. i. or higher. A differential of about 300 p. s. i. was required to expand each O ring 23 sufficiently to break its sealing contact with the gate. All of the O rings in this instance were made of a synthetic rubber of the type known by the trade-name of Hycar.

It will be evident that a variety of materials can be used for the resilient O rings, depending upon service and pressure requirements. For example in addition to using synthetic rubbers such as Hycar or neoprene, which permit a fair amount of give and stretch, I can use O rings made of harder materials such as nylon or Teflon.

It will be evident that my valve possesses many advantages over gate valves of conventional construction. It makes possible bubble tight shutoff over a wide range of operating pressures, such as pressures ranging up to 3000 p. s. i. or higher. For a given operating pressure relatively small effort is required to move the gate between open and closed positions. By use of a simple gauging arrangement one can demonstrate that no line leakage is occurring.

The present application is a continuation in part of subject matter disclosed in my co-pending application Serial No. 331,839 filed January 19, 1953 and 365,801 filed July 3, 1953. Also reference is made to my co-pending applications 3,728 filed January 22, 1948, now Patent No. 2,713,989, granted July 26, 1955; 100,225 filed June 20, 1949 (now abandoned); and 271,037 filed February 11, 1952, now Patent No. 2,810,542, granted October 22, 1957.

I claim:

1. In a valve construction a body providing flow passages and a body space between said passages, said passages being adapted to connect with upstream and downstream piping, a gate disposed within the body and movable transversely of the flow passages between open and closed positions, resilient seal rings of the O-ring type disposed on opposite sides of the gate, mounting means for each of said seal rings, said mounting means being carried by the body and formed to provide annular recesses for accommodating the seal rings, whereby the seal rings embrace the passages when the gate is in closed position, said seal ring normally serving to establish seals between the body and the gate, and means incorporated in each mounting means serving to break sealing engagement between a seal ring and the adjacent surface of the upstream side of the gate responsive to application of a differential fluid pressure to the exterior periphery of said seal ring from the body space.

2. A valve as in claim 1 in which said last means includes a main mounting ring mounted between a portion of the body and the gate and having limited axial movement relative to the body, and an inner seat ring slidably fitted within the mounting ring and interposed between the mounting ring and the adjacent surface of the gate, said inner seat ring having its outer periphery formed to provide a seating surface for the inner periphery of the corresponding seal ring, said mounting ring being movable in a direction away from the gate together with said seal ring when fluid pressure differential is applied to the exterior periphery of the seal ring.

3. A valve as in claim 2 in which each mounting ring is fitted within a cylindrical bore formed in the body and the seat ring is slidably fitted within a cylindrical bore formed in the mounting ring, the first bore being substantially larger in diameter than the second bore.

4. In a valve construction, a body providing flow passages and a space between said passages, a flat gate disposed within the body and movable transversely of the flow passages between open and closed positions, resilient seal rings of the O-ring type disposed on opposite parallel sides of the gate and adapted for normal sealing contact with the same, a mounting means for each of said seal rings, each mounting means being formed to provide annular recesses for accommodating the associated seal ring, whereby the two seal rings embrace the inlet and downstream passages of the body, each of said mounting means comprising a mounting ring interposed between the body and the gate and having a cylindrical portion, said mounting ring embracing the corresponding passage of the body, springs acting between the body and each mounting ring and serving to urge each mounting ring towards the gate, the valve body having alined bores adapted to slidably accommodate the cylindrical portions of the mounting rings, sealing means interposed between each of said bores and the associated mounting ring, a cylindrical bore formed in that end of each mounting ring that is faced toward the gate, an inner seat ring of rigid material slidably fitted within each of said last named bores, one end face of each seat ring being adapted to have direct contact with the adjacent face of the gate, each mounting ring being formed to provide an annular O-ring accommodating recess surrounding the associated seat ring whereby the exterior periphery of each seat ring forms a seating surface for said seal ring, that end of each seat ring adjacent the gate being formed to provide an outwardly extending annular lip which functions to retain the O-ring within its accommodating recess, the diameter of the first named bore being substantially greater than the diameter of the second named bore in which the seat ring is fitted, and the dimensioning of both said mounting rings together with the gate and said body bores being such that the mounting ring on the upstream side has freedom of movement away from the gate to thereby cause sealing contact between the corresponding O-ring and the gate to thereby relieve trapped body pressure.

5. A valve as in claim 4 together with means carried by each mounting ring forming a lip which engages the exterior periphery of the corresponding seal ring and which aids in the retention of the seal ring within its accommodating recess.

6. A valve as in claim 5 in which said last named means provides a lip having an inner inclined surface extending at an acute angle with respect to the corresponding side face of the gate, the accommodating recess having an outer extension adjacent said inclined surface whereby the resilient seal ring is retracted from sealing contact with the gate in response to differential fluid pressure applied to its inner periphery.

References Cited in the file of this patent

UNITED STATES PATENTS

| | | |
|---|---|---|
| 743,511 | Huxley | Nov. 10, 1903 |
| 2,030,458 | McKellar | Feb. 11, 1936 |

(Other references on following page)

UNITED STATES PATENTS

| | | |
|---|---|---|
| 2,041,669 | Whittle | May 19, 1936 |
| 2,383,983 | Melichar | Sept. 4, 1945 |
| 2,510,442 | Volpin | June 6, 1950 |
| 2,529,412 | Parker | Nov. 7, 1950 |
| 2,558,260 | Maky | June 26, 1951 |
| 2,614,793 | Storm | Oct. 21, 1952 |
| 2,664,267 | Ray | Dec. 29, 1953 |
| 2,674,436 | Jones | Apr. 6, 1954 |
| 2,732,170 | Shand | Jan. 24, 1956 |

FOREIGN PATENTS

| | | |
|---|---|---|
| 863,183 | Germany | Jan. 15, 1953 |